(12) United States Patent
Mölter et al.

(10) Patent No.: US 10,634,600 B2
(45) Date of Patent: Apr. 28, 2020

(54) DEVICE FOR COUNTING PARTICLES

(71) Applicant: PALAS GMBH PARTIKEL-UND LASERMESSTECHNIK, Karlsruhe (DE)

(72) Inventors: Leander Mölter, Wörth am Rhein (DE); Maximilian Weiss, Weingarten (DE)

(73) Assignee: PALAS GMBH PARTIKEL-UND LASERMESSTECHNIK, Karlsruhe (DE)

( * ) Notice: Subject to any disclaimer, the term of this patent is extended or adjusted under 35 U.S.C. 154(b) by 229 days.

(21) Appl. No.: 15/566,050

(22) PCT Filed: Apr. 14, 2016

(86) PCT No.: PCT/EP2016/000611
§ 371 (c)(1),
(2) Date: Oct. 12, 2017

(87) PCT Pub. No.: WO2016/165827
PCT Pub. Date: Oct. 20, 2016

(65) Prior Publication Data
US 2018/0136106 A1 May 17, 2018

(30) Foreign Application Priority Data
Apr. 16, 2015 (DE) .................. 10 2015 004 853

(51) Int. Cl.
*G01N 15/06* (2006.01)
*B01D 5/00* (2006.01)
*G01N 15/00* (2006.01)

(52) U.S. Cl.
CPC .......... *G01N 15/065* (2013.01); *B01D 5/006* (2013.01); *G01N 2015/0046* (2013.01)

(58) Field of Classification Search
CPC ......... G01N 15/065; G01N 2015/0046; B01D 5/006
USPC .......................................................... 73/863
See application file for complete search history.

(56) References Cited

U.S. PATENT DOCUMENTS

| 5,026,155 | A  | 6/1991  | Ockovic et al. |
| 5,659,388 | A  | 8/1997  | Scheer et al. |
| 6,498,641 | B1 | 12/2002 | Schildmeyer |
| 7,543,803 | B2 | 6/2009  | Moelter et al. |
| 7,828,273 | B2 | 11/2010 | Moelter et al. |

(Continued)

FOREIGN PATENT DOCUMENTS

| DE | 10 2005 001 992 A1 | 7/2006 |
| EP |     1 681 549 A2   | 7/2006 |

*Primary Examiner* — Daniel S Larkin
(74) *Attorney, Agent, or Firm* — McGlew and Tuttle, P.C.

(57) ABSTRACT

A device for condensing vapor on condensation nuclei, especially for a particle counter, includes an inlet, via which a gas stream carrying particles as condensation nuclei enters into a feed channel; with a saturation channel. An evaporation unit extends over at least a part of the saturation channel. In the evaporation unit a working liquid can be evaporated in the saturation channel. An outlet leads to a measuring unit. At least one flow passage is provided from the feed channel towards the saturation channel. The at least one flow channel is directed at an angle greater than 90° in relation to a direction in which the feed channel extends.

19 Claims, 2 Drawing Sheets

(56) References Cited

U.S. PATENT DOCUMENTS

| | | |
|---|---|---|
| 7,988,135 B2 | 8/2011 | Moelter et al. |
| 8,208,132 B2 * | 6/2012 | Huetter ................ G01N 15/065 |
| | | 356/37 |
| 2003/0202169 A1 | 10/2003 | Liu |
| 2006/0158640 A1 | 7/2006 | Moelter et al. |
| 2008/0083274 A1 | 4/2008 | Hering et al. |
| 2008/0137065 A1 | 6/2008 | Oberreit et al. |
| 2008/0152547 A1 | 6/2008 | Hopke et al. |
| 2009/0236762 A1 | 9/2009 | Moelter et al. |
| 2010/0180765 A1 | 7/2010 | Son et al. |
| 2010/0264554 A1 | 10/2010 | Moelter et al. |

\* cited by examiner

DEVICE FOR COUNTING PARTICLES

CROSS REFERENCE TO RELATED APPLICATIONS

This application is a United States National Phase Application of International Application PCT/EP2016/000611, filed Apr. 14, 2016, and claims the benefit of priority under 35 U.S.C. § 119 of German Application 10 2015 004 853.8, filed Apr. 16, 2015, the entire contents of which are incorporated herein by reference.

FIELD OF THE INVENTION

The present invention pertains to a device for condensing vapor on condensation nuclei, especially for a particle counter, with an inlet, via which a gas stream carrying particles as condensation nuclei enters into a feed channel; with a saturation channel; with an evaporation unit extending at least over a part of the length thereof, in which unit a working liquid can be evaporated in the saturation channel; and with an outlet, which leads to a measuring unit.

BACKGROUND OF THE INVENTION

Devices of this class are known, in which a gas stream carrying particles, i.e., a flowing aerosol, is introduced into an evaporation unit, in which a working liquid, for example, butyl alcohol, is heated and evaporated. The evaporated molecules of the working liquid are deposited on particles to be measured, as a result of which the effective diameter of the particles to be measured increases. The gas stream is transported in this form farther in the direction of the outlet to the measuring unit, which detects the enlarged particles, for example, by optical devices.

The gas stream carrying particles is cooled with the molecules of the working liquid in a condensation unit. The particles of the gas stream now act as condensation nuclei, as a result of which their effective diameter is increased once more and the detection of the particles is simplified hereby. A device of this class with an advantageous evaporation unit is known especially from DE 10 2005 001 992 A1/EP 1 681 549 A2, whose disclosure content is made the subject of the present disclosure (related U.S. Pat. Nos. 7,543,803; 7,828,273; and 7,988,135 are hereby incorporated by reference).

It is common to all embodiments that the gas stream carrying particles, which is sent through the device, is always present as a laminar flow. The gas stream flows, when viewed in the cross section, in imaginary layers, there is no mixing of the layers with one another, so that no turbulent flows develop. The heating elements are provided in all embodiments of this class on the radial outer side of the channel, through which the gas stream flows, so that the highest percentage of evaporated working liquid is always present there and the concentration decreases rapidly inwards in the radial direction.

Directions will always be described below by a cylindrical coordinate system. The axial direction corresponds here to the longitudinal axis of the device from the aerosol inlet to the aerosol outlet. The aerosol device is usually, but not necessarily, oriented at right angles, the outlet being located above the inlet. A radial direction is at right angles to the axial direction, and so is a circumferential direction, which is also at right angles to the radial direction.

The response rate of the particle counter depends especially on the time that is needed for mixing the gas stream with the evaporated working liquid. Based on the laminar flow of the gas stream, an upper limit is set, on the one hand, to the flow velocity of the gas. On the other hand, a laminar flow has a greatly varying velocity profile in the radical cross section, and the flow velocity is highest in the radial cross section in the radial center of the flow cross section and drops towards the radial outer side. Thus, there is low flow velocity precisely in the area with the highest concentration of evaporated working liquid, which leads to reduced mixing. This considerably compromises the response rate of the particle counter.

SUMMARY OF THE INVENTION

Therefore, an object of the present invention is to further develop a device of this type such that the above-mentioned drawbacks are eliminated and, in particular, a higher response rate of the particle counter is possible.

This object of the present invention is accomplished with a device comprising a feed channel with an inlet, via which a gas stream carrying particles as condensation nuclei enters the feed channel, a saturation channel, an evaporation unit, which extends at least over part of a length of the saturation channel, in which evaporation unit a working liquid can be evaporated in the saturation channel, an outlet, which leads to a measuring unit and at least one flow passage provided from the feed channel to the saturation channel and is oriented at an angle greater than 90° in relation to the direction in which the feed channel extends.

An elongated passage, which is closed in the circumferential direction, preferably has a circular cross section, i.e., a cylindrical contour, but may also taper, is called a channel of the particle-containing or aerosol flow. A polygonal configuration is not ruled out, either. By contrast, an upwardly open liquid channel for the working liquid to be evaporated is designated as such (but with the special qualifier "open").

In particular, a turbulent flow is generated in the variant according to the present invention. Turbulent zones, which greatly accelerate the mixing of the particle-carrying gas stream with the evaporated working liquid, are formed during the flow of the working liquid evaporated in the evaporation unit through said evaporation unit. By utilizing the flow of the gas stream, the flow velocity of the gas stream can also be homogenized over the cross section, because the stringent requirement calling for a laminar gas stream is eliminated. Increased and accelerated mixing with the evaporated working liquid is achieved due to the formation of turbulent zones. At the same time, there are no losses of particles due to separation at the wall. Since the velocity profile of the gas stream is homogenized because of the accelerated and increased mixing of the gas stream with the working liquid, and the residence time of all particles in the evaporation and condensation unit is largely equal, the response rate of the particle counter increases in this manner.

It is essential that the device according to the present invention has a compact design and a compact base and especially a small overall volume. The mixing ratio of liquid to be evaporated and/or of the upper temperature can thus be changed rapidly. As a result, the temperature-dependent lower detection limit, the cut-off of the particles in the flow, at which deposition of (evaporated) evaporation liquid takes place, can be changed equally rapidly as a result. Particle size functions can thus optimally be determined as condensation nuclei of the particles in the flow.

The lower detection limit according to ISO 15900 and ISO 27891 can be set very rapidly at measurement times of up to several hours in the minute range, especially in the range of less than three minutes, in a reproducible manner. The cut-off diameter can preferably be set during particle measurements at 7 nm for environmental measurements, at 23 nm for the measurement of diesel exhaust particulates according to the European PMP Guideline and at 30 nm, 50 nm and/or, e.g., 70 nm for applications in clean rooms. Rapid setting of the temperatures and of the temperature difference of the evaporation element and of the condensation element is thus possible.

This is achieved especially by a rotationally symmetrical configuration of the device with concentrically arranged channels. The vertical feed channel is arranged centrally and has a tubular configuration. A plurality of flow passages, distributed equally over the circumference of the feed channel, extend to the lower inlet areas of the saturation channel from the upper end of the feed channel obliquely backward and downward at an angle ? greater than 90°.

The cross section and especially also the overall cross section of the flow passages is smaller than the cross section of the feed channel. Three to eight and especially four flow passages are preferably provided at mutually angularly equally spaced locations. The feed channel and the flow passages are preferably cylindrical, i.e., they are configured with circular cross sections. By contrast, the saturation channel presetting these concentrically is in the shape of a cylinder jacket, i.e., it is a ring channel.

The particle flow accordingly changes the flow direction by an angle $\alpha=\beta$ greater than 90° from the feed channel to the flow passages, on the one hand, and from the flow passages to the saturation channel, on the other hand. The flow directions of the particle flow in the feed channel and the saturation channel are parallel. As a result, an extremely compact configuration of the device is obtained. Very good mixing is thus achieved due to a soft turbulent flow, and low diffusion losses are obtained, especially for small particles <5 nm.

The saturation channel tapers to a tip in its vertically upper, downstream area and narrows the ring channel to yet another cylindrical condensation channel following it downstream, which is aligned with the feed channel. The axes of the feed channel and condensation channel consequently coincide. The outlet for the particle flow is narrowed even more.

The volume flows of adequate condensation particle counters are typically approx. 1 L/min. Finally, a slight adaptation of the corresponding device (scaling) to desired particle flow passage measurements, e.g., up to 3 L/min, but also up to 10 L/min especially in case of measurements in clean rooms, is easily possible due to the described concentric configuration of the device according to the present invention.

Typical dimension values for a device with a particle flow throughput of about 3 L/min are the following: The basic height is 180-240 mm, the diameter of the inlet is 5-6 mm, the length of the inlet is 40-60 mm, the diameter of the flow passages is 1-2 mm, the length is 15-20 mm, the internal diameter of the saturation channel is 10-15 mm, the external diameter of the saturation channel is 35-45 mm and the thickness of the ring passage of the saturation channel is thus 10-15 mm, the axially parallel length of the saturation channel is 35-45 mm, the length of this area tapering to a tip to the narrowing in the condensation channel is 20-30 mm, the length of the condensation channel in the broad area is 30-40 mm and the diameter there is 10-15 mm, the length of the narrowed area is 15-20 mm, and the diameter of the particle outlet is 4-6 mm.

Provisions are preferably made for the at least one flow passage to have a direction component opposite the direction in which the feed channel extends. Due to the deflection of the aerosol flow, which is brought about hereby, the formation of turbulent flows is facilitated in the evaporation unit. This also offers the possibility of a compact design, because the device may have a shorter axial length due to the (partial) return of the gas stream. This is especially true if the flow passage is preferably oriented at an angle of up to 180° in relation to the direction in which the feed channel extends.

Provisions may be made for the radial flow diameter of the flow passage to be smaller than the flow diameter of the feed channel and/or of the saturation channel, and the cross sections are especially also determined in this manner. The flow velocity of a flow increases with decreasing radial cross section, which supports the formation of turbulent flows. This additionally increases the response rate of the particle counter.

The at least one flow passage in the evaporation unit may preferably be configured as a hole in a guide body. This means a simple configuration of the flow passage. Provisions are made in a highly preferable manner for an especially coaxially extending feed channel to pass at least partly through the guide body. Both at least parts of the feed channel and the flow passage can thus be embodied in the guide body, which is not only possible with a simple configuration, but also represents a compact configuration.

The evaporation unit may have an upper inlet and a lower outlet for feeding and removing the working liquid, the inlet being arranged vertically above the outlet. It is thus made possible for the working liquid to move downward after entry into the interior of the evaporation unit based on gravity and thus to move in the direction of the outlet especially in steady contact with the flow space of the aerosol. Another advantage of this configuration arises from the fact that the main flow direction of the working liquid is directed opposite the gas stream and a better mixing is thus achieved. The liquid outlet is located in this embodiment in the vicinity of the bottom of the evaporation unit on the axial underside thereof. It is ensured now that the non-evaporated working liquid will not remain in the evaporation unit but can be removed and also recycled at the bottom thereof via the outlet.

The working liquid is fed to the inlet of the evaporation unit preferably by a pump, especially a diaphragm pump, from a receiver vessel, via lines, such as tubes, and is likewise delivered in the same manner from the outlet by a pump, such as a diaphragm pump, to the receiver vessel. The evaporation unit itself is preferably led helically concentrically to the particle flow space and is configured as being in fluid contact with this, as this is disclosed in detail in EP 1 681 549 A2 and, as was already stated above, as it is made fully the disclosure content of the present disclosure.

Provisions are made in advantageous embodiments for the saturation channel of the evaporation unit, configured in a jacket-like manner, to be a ring channel, the saturation channel being defined radially inwardly by the guide body and radially outwardly by the inner wall of the evaporation unit. Due to this embodiment, the gas stream flows radially outside the center of the evaporation unit. This additionally improves, on the one hand, the contact in the evaporated working liquid and is thus used to increase the mixing, and the outer circumferential surface carrying the evaporation device is enlarged as well at equal flow cross section, as a result of which the contact surface is increased. Reference is again made concerning a preferred embodiment of the evaporation unit to DE 10 2005 001 992 A1/EP 1 681 549 A2.

Provisions are made in preferred embodiments of the present invention for the saturation channel to have a homogeneous temperature between 28° C. and 40° C. for the working liquid butyl alcohol and between 45° C. and 60° C. for the working liquid water. This temperature may be coordinated with the evaporation properties of the working liquid, the homogeneity of the temperature within the evaporation element preventing an excessive concentration gradient of the evaporated working liquid, for example, due to convective motions. In addition, the homogeneous temperature of the evaporation element promotes the mixing of the working liquid with the gas stream.

A condensation unit with a condensation channel may preferably be provided, wherein especially the condensation channel is cooled by a cooling device. The temperature of the condensation channel may especially preferably have a homogeneous temperature between 5° C. and 25° C. for the working liquid butyl alcohol and a temperature between 15° C. and 30° C. for the working liquid water. Especially combined with the heated area of the evaporation unit, the gas stream flowing through the condensation channel, which also contains evaporated molecules of the working liquid in addition to the particles, undergoes cooling. This leads to condensation of the evaporated molecules of the gas stream acting as condensation nuclei of heterogeneous condensation and leading to a faster condensation. As a consequence of this, the effective diameter of the particles increases, which simplifies the detectability of these particles by the measuring unit.

A first nozzle unit may be provided axially between the evaporation unit and the condensation unit, the inlet opening of the first nozzle unit corresponding to the saturation channel of the evaporation unit and the outlet opening of the first nozzle unit being coaxial to this. The jacket-shaped saturation channel is transformed by this design embodiment into a coaxial channel, which opens after the outlet opening of the first nozzle unit into the condensation channel of the condensation unit. The radial merging of the saturation channel makes possible an additional mixing of the particles of the gas stream with the evaporated molecules of the working liquid. In addition, a radially centered aerosol stream led through a cylindrical channel has a greater independence in terms of temperature variations on the outer wall of the device.

The cross-sectional area of the outlet opening of the first nozzle unit may preferably be smaller than the cross-sectional area of the inlet opening of the first nozzle unit. As a consequence of the narrowing of the cross section that is associated herewith, the flow velocity of the gas stream increases, which additionally facilitates the mixing of the particles with the working liquid.

A second nozzle unit may additionally be provided axially between the condensation unit and the outlet, the cross-sectional area of the outlet opening of the second nozzle unit being smaller than the cross-sectional area of the inlet opening of the second nozzle unit. As a result, the velocity of the gas stream through the narrowing of the cross section of the second nozzle unit is increased even more, as a result of which the gas stream can flow out of the device and be fed to the measuring unit adjoining same faster.

A particle-measuring device may very preferably have a device according to the present invention, so that the response rate of the particle-measuring device is increased as a consequence of the properties of the device according to the present invention.

Other features and advantages of the present invention appear from the claims and from the following description, in which an exemplary embodiment of the present invention is explained in detail with reference to the drawings.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
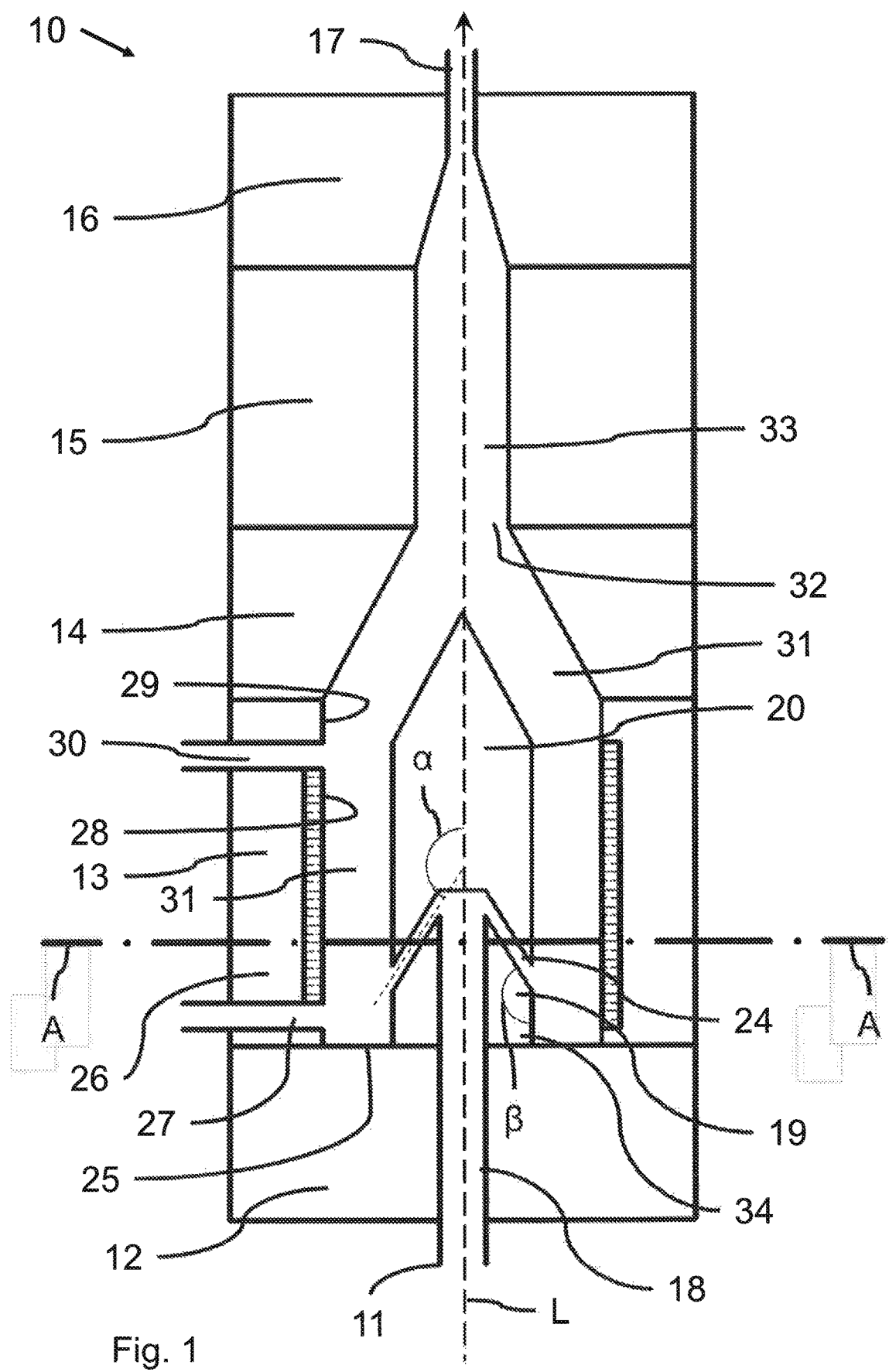
FIG. 1 is a schematic sectional view through a device according to the present invention.

Referring to the drawings, FIG. 1 shows in a sectional view a device 10 according to the present invention for condensation, which may be part of a particle counter (not shown), which has a measuring unit (not shown) in addition to the device 10. In particular, a particle counter, which detects small particles of an aerosol, which act as condensation nuclei, may be arranged downstream of the device 10.

The device 10 has an inlet 11, a connection unit 12, an evaporation unit 13, a first nozzle unit 14, a condensation unit 15, a second nozzle unit 16, and an outlet 17 for the particle flow.

Directions will be described below in a cylindrical coordinate system, whose axial direction corresponds to the longitudinal axis L of the essentially cylindrically symmetrical device 10. The direction in which the longitudinal axis L extends from the inlet 11 to the outlet 17 is called here the axial direction. The axial direction is indicated in FIG. 1 with an arrow at the upper end of the longitudinal axis L. The radial extension is at right angles to the longitudinal axis L; the circumferential extension is at right angles to both above-mentioned directions. The longitudinal axis L is usually at right angles.

The connection unit 12 closes the device 10 downwardly in the axial direction. The inlet 11 of the saturator 13 is coaxial to the longitudinal axis L in the connection unit 12 and opens into a feed channel 18, which is configured as a coaxial hole in the connection unit 12.

The connection unit 12 is connected to the evaporation unit 13. On the axial upper end face, the connection unit 12 has a coaxial guide body 19, which protrudes into the inner space of the evaporation unit 13 coaxially in the direction of the longitudinal axis L. The feed channel 18 passes coaxially through the guide body 19, whose radial dimension approximately corresponds to twice the diameter of the cross section of the feed channel 18. The feed channel 18 protrudes into the guide body 19 about one third of the axial length thereof. This area represents a connection area 34 of the guide body 19, and the rest of the area of the guide body 19 up to its axially upper end is called the deflection area 20.

Distributed in the circumferential direction, four flow passages 24 located at spaced locations from one another in the circumferential direction are formed by cylindrical holes in the guide body 19 at mutually equal radial directions from the longitudinal axis L. These extend here each with an elongated coaxial extension component in relation to the direction of the longitudinal axis L at an angle of about 150° and are directed radially outwardly and axially (opposite the direction of the longitudinal axis L) downwardly. The ends of the flow passages 24 point to a bottom 25 on the axial underside of the evaporation unit 13. Instead of the four flow passages 24, any desired number of flow passages 24 is conceivable. The flow passages 24 open into a cylinder jacket-shaped saturation channel 31, which coaxially surrounds the guide body 19 and is surrounded radially outwardly by an inner wall 26 of the evaporation unit 13 as well as downstream by the wall of the first nozzle unit 14, which is arranged at a radially spaced location from the guide body 19.

The axial top side of the deflection area 20 of the guide body 19 has the shape of a pointed cone. The wall of the first nozzle unit 14 follows the conical deflection area 20 at a radially spaced location. The ring-shaped saturation channel 31 thus passes over first into a cylindrical condensation channel 33 into the condensation unit 15 over the tip of the deflection area 20. The outlet 17, which is further extended in cross section, in the second nozzle unit 16 is connected to the condensation channel 33.

An evaporation part 28 is provided on the radial inner side of the inner wall 26 of the evaporation unit 13 over the entire circumference thereof. This evaporation part is shown only very schematically. The evaporation part 28 is preferably configured with a helical, upwardly open liquid channel for receiving the liquid to be evaporated, as this is described in DE 10 2005 001 992 A1/EP 1 681 549 A2, whose disclosure is made fully the disclosure content of the present disclosure. The evaporation part 28 may have, in principle, another configuration known from the state of the art, especially as this is described as the state of the art in the documents cited or in the methods described in the documents cited.

An inlet 30 is located axially above the evaporation part 28, and an outlet 27 for the liquid to be evaporated is located axially above. The radial inner wall 26 of the evaporation unit 13 is perforated by an outlet 27 leading radially outward at the axial level of the bottom 25. The outlet 27 is configured as a cylindrical hole on the left-hand side of the section of the evaporation unit 13 shown in FIG. 1. Both the inlet 30 and the outlet 27 are located at the same location on the circumference. Both the inlet 30 and the outlet 27 are part of a pumping circuit for transporting the working liquid to be evaporated, which circuit is not shown in greater detail here (reference is thus likewise made to DE 10 2005 001 992 A1/EP 1 681 549 A2).

A jacket-like saturation channel 31 is formed by the radial intermediate space between the evaporation part 28, the outlet 27 and the inlet 30, on the one hand, and the guide body 19 arranged coaxially inside, on the other hand. The saturation channel 31 is defined radially inwardly by the inner wall of the guide body 19 and radially outwardly by an inner wall 29 of the evaporation unit 13 and the evaporation part 28. The radial cross section of saturation channel 31 is larger than the radial cross section of the flow passages 24 and of the feed channel 18.

The saturation channel 31 is heated homogeneously to a temperature between 28° C. and 40° C. by the evaporation part 28 in case of butyl alcohol being used as the working liquid.

As was mentioned, the saturation channel 31 opens in the axial direction at the upper end of the evaporation unit 13 into the channel of the first nozzle unit 14. The first nozzle unit 14 is connected to the evaporation unit 13. In the area of the first nozzle unit 14, the saturation channel 31 points radially inward, in addition to its basically axial extension, so that the channel assumes a circular cross section at the outlet opening 32 of the first nozzle unit 14 and passes over, via an outlet opening of the first nozzle unit 14, into the cylindrical, coaxial condensation channel 33 of the condensation unit 15.

The condensation channel 33 of the condensation unit 15 can be cooled by cooling elements (not shown) to a homogeneous temperature between 5° C. and 25° C. The radial cross section of the condensation channel 33 is constant in the area of the condensation unit 15.

The condensation unit 15 is joined axially upwardly by the second nozzle unit 16, whose axially centered channel has an axially upwardly tapering radial cross section, which finally leads to the outlet 17 of the device 10.

The inlet 30 for the liquid to be evaporated to the evaporation element is used to feed the working liquid to be evaporated, for example, butyl alcohol. The working liquid is at first liquid and is fed into the evaporation unit through the inlet 30 on the axial top side of the evaporation unit 13. The working liquid then enters the area of the evaporation part 28 and flows downward through this or along same, depending on the configuration, at the evaporation part 28 as a consequence of gravity. The working liquid evaporates due to the temperature effect of the heating element, so that at least part of the working liquid enters the area of the saturation channel 31 in the gaseous phase. A non-evaporated portion of the working liquid flows vertically or axially farther downward, reaching the bottom 25 of the evaporation unit 13, where the outlet for the non-evaporated evaporation liquid returns the non-evaporated portion of the working liquid to the pumping circuit and a liquid portion corresponding to the evaporated portion is added to it. It is thus avoided that the non-evaporated portion of the working liquid remains on the bottom 25 of the evaporation unit 13.

Figure 2:
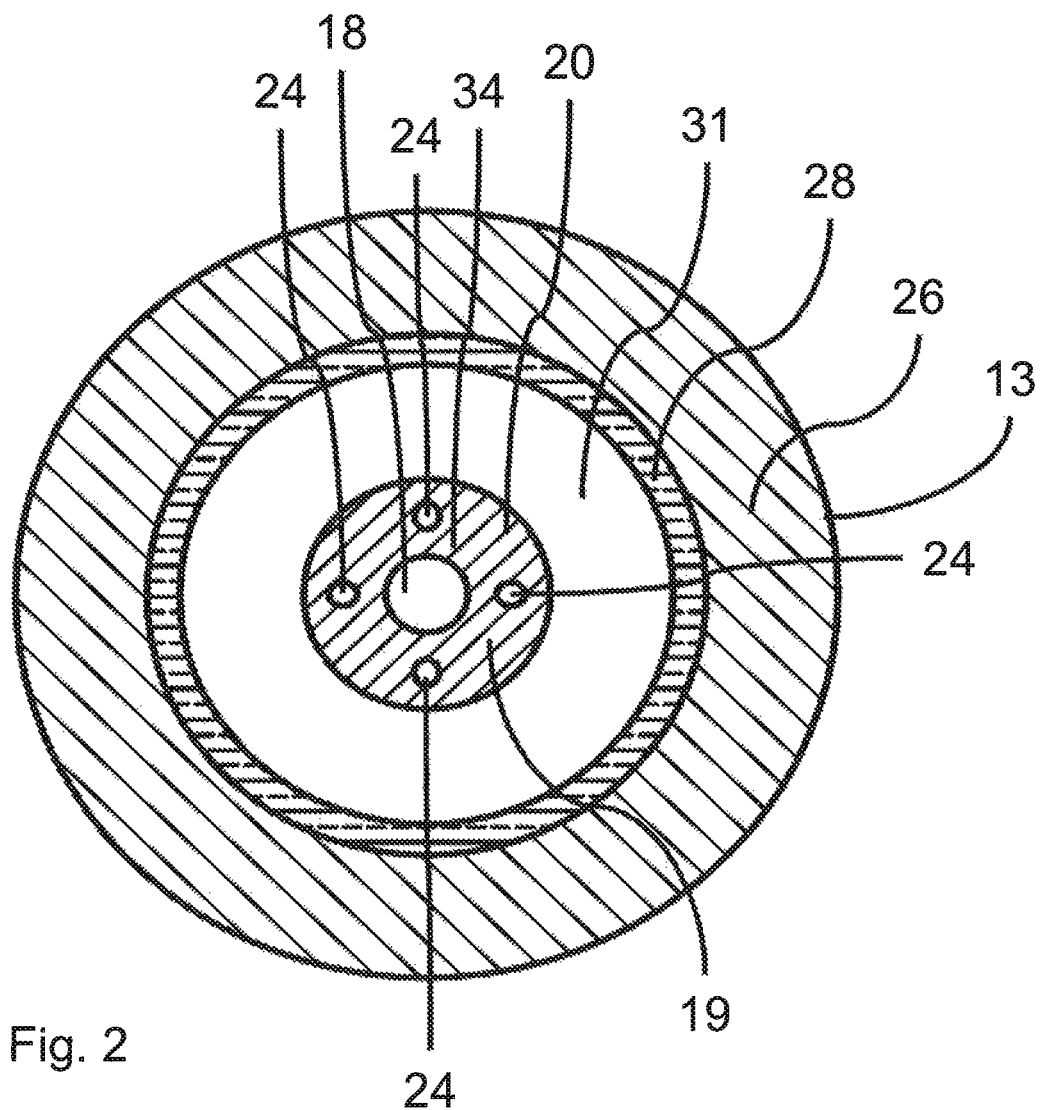
FIG. 2 is a cross sectional view through the configuration shown in FIG. 1 at the axial level of a section axis A.

FIG. 2 shows a section through a section plane A of FIG. 1 at the axial level of the connection area 34 of the guide body 19. This shows the four flow passages 24 arranged on the circumference. The flow passages are separated from one another in space. Arranged radially between the flow passages 24 and the feed channel 18, the connection area 34 of the guide body 19 is located between the flow passages 24, and the deflection area 20 of the guide body 19 is located radially between the flow passages 24 and the saturation channel 31 in the section plane shown FIG. 2. Further, the cylinder jacket-like configuration of the evaporation part 28 can be seen in FIG. 2 next to the cylinder jacket-like saturation channel 31.

The shape of the cross section of the flow passages 24 shown in FIG. 2 is slightly elliptical, but other configurations, for example, a polygonal cross section, or a cross section varying over the extension direction, are also conceivable.

The procedure employed in the device 10 according to the present invention shall be illustrated below with the use of a gas stream carrying particles:

The particles may be particles with diameters of up to and greater than 1 nm, but especially nanoparticles, i.e., with a spatial dimension of about 1 nm to 100 nm. A gas stream containing the particles, i.e., an aerosol, is introduced into the feed channel via the inlet 11 on the axial underside of the device, and it flows in the direction in which the longitudinal axis L extends, here axially upward. At the of the feed channel 18 the flow reaches the guide body 19 in the evaporation unit 13 and is guided into the four flow passages 24 as a consequence of the pressure generated by the flow. The direction of flow of the gas stream changes by an angle greater than 90°, here by 150°, as a consequence of the described configuration of the flow passages 24, especially in relation to the feed channel 18.

The aerosol flow is again deflected at the respective end of the flow passages by more than 90° (here at an angle of 150°) and it enters the saturation channel 31. At least at this point, the flow is not a laminar flow any longer because of the twofold considerable change in direction (as it may still have been in the feed channel 18) but a turbulent flow, which is not, however, a pronounced turbulent flow and can be called a "soft" turbulent flow.

A laminar flow of a fluid is characterized in the sense of the present invention in that the fluid (here gas or aerosol) moves in imaginary layers without the layers mixing with one another. By contrast, a turbulent flow has turbulences called turbulent flows and thus contains flow areas that are not directed parallel to the main motion or flow, and separation of flow lines takes place as well. In particular, a turbulently flowing fluid has a rather substantial percentage of flow directions not directed along the flow direction.

As was described, molecules of the working liquid are present in the gaseous phase in the saturation channel 31. The turbulent gas stream moves upward with a main motion direction axially in the saturation channel 31 and is mixed with the gaseous portion of the working liquid as a consequence of the turbulent flows. The degree and the velocity of the mixing with the working liquid are greatly increased compared to a laminar flow as a consequence of the turbulent flows of the gas stream.

Farther axially upward in the flow direction, the saturation channel 31 opens into the channel of the first nozzle unit 14. The channel of the first nozzle unit 14 is configured such that it has a radially inwardly directed component in relation to the longitudinal axis L, so that the channel of the first nozzle unit 14 passes over into the cylindrical coaxial condensation channel 33 of the condensation unit 15 in the area of the outlet opening 32.

The condensation channel 33 is cooled by cooling elements (not shown) of the condensation unit 15 to a temperature between 5° C. and 25° C. This leads to condensation of the evaporated molecules of the working liquid. The particles of the gas stream act as condensation nuclei. As a consequence of the condensation, molecules of the working fluid are deposited on the particles of the gas stream and increase the effective spatial diameter. The now cooled flow enters, as was described, through the outlet of the condensation unit 15 into the second nozzle unit 16, whose radial cross section tapers upward in the axial direction, so that the velocity of the gas stream increases until the gas stream is fed through the outlet 17 of the device 10 to the connected measuring unit (not shown).

Due to the velocity profile of the flow, there is an extensive homogenous mixing with the evaporated portion of the working liquid. The effective spatial dimension of the particles in the flow increases due to the condensation. This change in size is essential for the later detectability of the particles. This change in size is improved by the turbulent flows of the gas stream compared to a laminar flow, as was stated, to a considerable extent.

The lower detection limit for the diameter of the particles to be detected is affected, among other things, by the temperature difference between the temperature of the evaporation element 13 and the temperature of the condensation element 15. Particles with a diameter beginning from 4 nm can be detected at a maximum temperature difference of about 35° C. between the evaporation zone and the condensation zone, but it is also possible, in particular, to configure detections of particle diameters of, e.g., 7 nm, 23 nm, etc., and especially 23 nm to 30 nm. The detectable diameter of the particles becomes smaller due to condensation due to greater temperature differences between the evaporation unit and the condensation unit than in case of smaller temperature differences.

While specific embodiments of the invention have been shown and described in detail to illustrate the application of the principles of the invention, it will be understood that the invention may be embodied otherwise without departing from such principles.

The invention claimed is:

1. A device for condensing vapor on condensation nuclei for a particle counter, the device comprising:

a feed channel with an inlet, via which a gas stream carrying particles as condensation nuclei enters the feed channel;

a saturation channel;

an evaporation unit, which extends at least over part of a length of the saturation channel, in which evaporation unit a working liquid can be evaporated in the saturation channel;

an outlet, which leads to a measuring unit;

a plurality of flow passages from the feed channel towards the saturation channel, the flow passages being distributed uniformly over a circumference of the feed channel, the flow passages being directed at an angle greater than 90° in relation to a feed channel direction corresponding to a direction in which the feed channel extends, the flow passages having a direction component contrariwise a direction in which the feed channel extends, the flow passages being directed at an angle greater than 90° in relation to a flow direction of the saturation channel.

2. A device in accordance with claim 1, wherein the feed channel and the saturation channel are arranged concentrically to one another.

3. A device in accordance with claim 1, wherein:

the saturation channel of the evaporation unit is configured in the form of a jacket as a ring channel;

the saturation channel is defined radially inwardly by a guide body and radially outwardly by the inner wall of the evaporation unit.

4. A device in accordance with claim 1, wherein the flow passages are directed in relation to the feed channel direction at an angle of up to 180°.

5. A device in accordance with claim 1, wherein:

a radial flow diameter of flow passages is smaller than a flow diameter of the feed channel; or a radial flow diameter of the flow passages is smaller than a flow diameter of the saturation channel; or a radial flow diameter of the flow passages is smaller than a flow diameter of the feed channel and the radial flow diameter of the flow passages is smaller than a flow diameter of the saturation channel.

6. A device in accordance with claim 1, wherein the at as flow passages in the evaporation unit is configured as a hole in a guide body.

7. A device in accordance with claim 6, wherein the feed channel passes at least partly through the guide body.

8. A device in accordance with claim 1, wherein the evaporation unit has an upper evaporation unit inlet and a lower evaporation unit outlet for feeding and removing the working liquid, the evaporation unit inlet being arranged axially above the evaporation unit outlet.

9. A device in accordance with claim 1, wherein the saturation channel has a homogeneous temperature between 28° C. and 40° C. in case of butyl alcohol as the working liquid and a temperature between 45° C. and 60° C. in case of water as the working liquid.

10. A device in accordance with claim 1, further comprising a condensation unit with a condensation channel.

11. A device in accordance with claim 10, wherein the condensation channel has a homogeneous temperature between 5° C. and 25° C. in case of butyl alcohol as the working liquid and a temperature between 15° C. and 30° C. in case of water as the working liquid.

12. A device in accordance with claim 10, further comprising first nozzle unit provided axially between the evaporation unit and the condensation unit, wherein an inlet opening of the first nozzle unit corresponds to an outlet end of the saturation channel of the evaporation unit and an outlet opening of the first nozzle unit is coaxial to the outlet end of the saturation channel.

13. A device in accordance with claim 12, wherein a cross-sectional area of the outlet opening of the first nozzle unit is smaller than a cross-sectional area of the inlet opening of the first nozzle unit.

14. A device in accordance with claim 12, further comprising another nozzle unit provided axially between the condensation unit and the outlet, wherein a cross-sectional area of an outlet opening of the second nozzle unit is smaller than a cross-sectional area of an inlet opening of the another nozzle unit.

15. A device in accordance with claim 10, wherein the condensation channel is cooled by a cooling device.

16. A particle-measuring device comprising a device for condensing vapor on condensation nuclei, the device comprising:
a feed channel with an inlet, via which a gas stream carrying particles as condensation nuclei enters the feed channel;
a saturation channel;
an evaporation unit, which extends at least over part of a length of the saturation channel, in which evaporation unit a working liquid can be evaporated in the saturation channel;
an outlet, which leads to a measuring unit;
a plurality of flow passages from the feed channel towards the saturation channel, the flow passages being distributed uniformly over a circumference of the feed channel, the flow passages being directed at an angle greater than 90° in relation to a feed channel direction corresponding to a direction in which the feed channel extends, the flow passages having a direction component contrariwise a direction in which the feed channel extends, the flow passages being directed at an angle greater than 90° in relation to a flow direction of the saturation channel.

17. A device for condensing vapor on condensation nuclei for a particle counter, the device comprising:
a feed channel with an inlet, wherein a gas stream carrying particles as condensation nuclei enters the feed channel via the inlet;
a saturation channel;
an evaporation unit for evaporating a working liquid in the saturation channel, the evaporation unit extending at least over part of a length of the saturation channel;
an outlet leading to a measuring unit;
a plurality of flow passages in fluid communication with the feed channel and the saturation channel, the flow passages being located between the feed channel and the saturation channel, the flow passages being directed at an angle greater than 90° in relation to a feed channel direction corresponding to a direction in which the feed channel extends, the flow passages being directed at an angle greater than 90° in relation to a flow direction of the saturation channel.

18. A device in accordance with claim 17, wherein the flow passages are distributed uniformly over a circumference of the feed channel, the feed channel extending in a feed channel direction, each of the flow passages extending in a flow passage direction, wherein at least a portion of the flow passage direction is opposite the feed channel direction, the evaporation unit being parallel to the feed channel.

19. A device in accordance with claim 17, wherein an inlet of each of the flow passages is adjacent to an outlet of the feed channel and an outlet of each of the flow passages is located adjacent to the saturation channel.

* * * * *